United States Patent Office 3,789,048
Patented Jan. 29, 1974

3,789,048
OLIGOMER POLYIMIDE PRECURSORS
Joseph H. Incremona, Bethel Park, Pa., assignor to E. I. du Pont de Nemours and Company, Wilmington, Del.
No Drawing. Continuation-in-part of abandoned application Ser. No. 92,540, Nov. 24, 1970. This application Nov. 2, 1971, Ser. No. 195,022
Int. Cl. C08g 20/32
U.S. Cl. 260—30.2                           9 Claims

ABSTRACT OF THE DISCLOSURE

Polyimides highly soluble in N-methyl pyrrolidone are provided. These are preferably derived from polyimide precursor systems consisting essentially of the nonfilm-forming reaction product of (a) the incomplete reaction product of bis-(3,4-dicarboxyphenyl) sulfone dianhydride and a capping agent, and (b) diamine including metaphenylene diamine.

RELATED APPLICATION

This application is a continuation-in-part of United States patent application Ser. No. 92,540, filed Nov. 24, 1970 and now abandoned.

This invention relates to a polyimide which is the reaction product of at least one member of the group consisting of (a) bis-(3,4-dicarboxyphenyl) sulfone dianhydride (CSDA) capped and partially capped derivative thereof, and (b) diamine comprising metaphenylene diamine, which polyimide has a solubility at 25° C. in N-methyl pyrrolidone of at least 0.15 g./ml. Accordingly, because of its high solubility, the polymer is more readily formable into uniform thicker sections than would be the case if the polymer tended to precipitate from the solvent.

The polymer is of film-forming molecular weight and preferable of sufficiently high molecular weight for a film thereof to be creasable.

The invention also includes a novel process for forming this polymer which process involves reacting the anhydride with a capping agent present in such amount, at such temperature, and for such time as to incompletely react all of the anhydride groups such as represented by Equation I below. The product mixture is the "incomplete reaction product" of the anhydride.

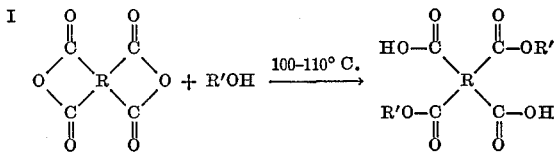

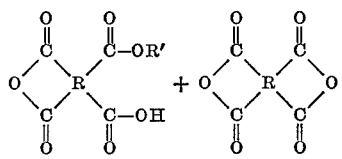

where R represents

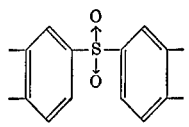

and where R' represents H, $CH_3$, $C_2H_5$, $C_3H_7$, $C_4H_9$.

Although a temperature of 100–110° C. is shown, higher or lower temperatures will suffice if the amount of capping agent and time of reaction are regulated to prevent complete reaction of all the anhydride. At 100–110° C. between about 1 and 3 moles of alcohol or water to dianhydride can be used with a 2 to 1 mole ratio being preferred. Reaction to a degree in excess of 20% and preferably of 50% reaction of the anhydride provides one embodiment of this invention and preferably utilizes capping agent in an amount of between about 1.5 to 1.8 moles of capping agent per mole of anhydride. Not less than 10% of original anhydride should remain as determined by known analytic techniques, in the "incomplete reaction product."

As will be understood, excess capping agent can be provided which capping agent will not be consumed at low temperature of reaction and short reaction times. Temperature as low as room temperature are thought to be suitable although the reaction may proceed too slowly for some purposes. Temperatures between 70 and 150° C. and most preferably between 100 and 110° C. are thought to be most suitable as aforementioned. Similarly, reaction times in excess of 20 minutes should suffice. Using a temperature of 100–110° C. and excess capping agent preferably between 45 minutes and 1½ hours is thought to be most suitable.

A diamine is then reacted with the incomplete reaction product. The mole percent ratio of diamine to the reaction product of the alcohol and dianhydride is preferably from about 0.9–1.1/1.0, respectively. A preferred ratio is an equimolar amount of diamine and incomplete reaction product. The reaction of diamine with the incomplete reaction product should be carried out at a low temperature. Temperatures are preferably below 70° C. and most preferably below 50° C. The resultant product is a nonfilm-forming reaction product as can be represented by the general structures:

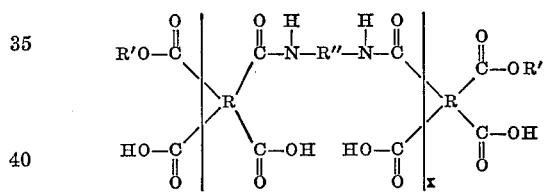

whee X is thought to be 1 or 2, preferably 1, plus other species such as:

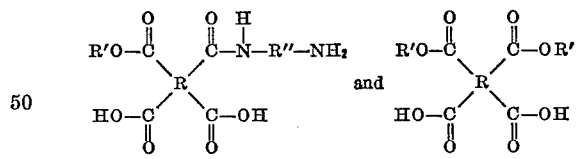

The reaction product mixture hereinafter is called the "oligomer mixture." The oligomer mixture is the "non-film-forming reaction product."

Film forming as used herein refers to the ability of a material to form a self-supporting film at room temperature (25° C.) when cast on a surface, from a solution of N-methyl pyrrolidone and heated to 125° C. to remove solvent and thereafter removed from the surface. It is an indicator of molecular weight. The oligomer mixtures are of low molecular weight material and thought to be primarily of less than 10 repeating units and thought to consist essentially of two or fewer units.

Metaphenylene diamine may be used as the sole diamine. However, when films of the polyimide of CSDA or the incomplete reaction product thereof are prepared from solution in N-methyl pyrrolidone, solvent may be retained sufficiently as to prevent full appreciation of the properties of the material at high temperatures.

Accordingly, additional diamine such as oxydianiline may be used in conjunction therewith. P-phenylene diamine and 4,4'-diamino diphenyl sulfone and methylene dianiline should also be suitable. In a still more preferred embodiment, separate oligomer mixtures can be prepared from the same or different anhydrides with the different diamines including metaphenylene diamine. These different oligomer mixtures may then be combined and cured to polyimide.

The above "oligomer mixture" or combinations thereof can be converted into a polyimide by thermal curing at temperatures usually about 150–325° C. for 30 minutes to 2 hours to yield a polyimide which is film-forming and preferably creasable.

The product of the combination of oligomer mixtures of the two diamines of metaphenylene diamine and oxydianiline is soluble in N-methyl pyrrolidone to the extent of at least 0.15 gram polyimide/ml. of N-methyl pyrrolidone at room temperature (25° C.) after dissolving at 100° C. when mixed in preferred proportion and has the advantage of improved performance at high temperatures.

Preferably the combination of oligomer solution should contain from 25 to 60% of an oligomer solution prepared from oxydianiline wiht a preferred combination being a 1.0:1.0 molar ratio of the two oligomer solutions having substantially the same percent solids content. This solution should range from 30 to 60% solids by weight with about 40 to 50% solids by weight being preferred. The Brookfield viscosity of a combined oligomer/N-methyl pyrrolidone solution is desirably between 5 and 25 poises.

As described hereinabove, the oligomer route provides a precursor system with high solids content with satisfactory low viscosity.

The polymer prepared from oxydianiline and CSDA or its "oligomer mixture" alone is not soluble to the extent of 0.15 g./ml. in N-methyl pyrrolidone. It is thought that other amines which also form polyimides with CSDA and its derivatives of limited solubility in N-methyl pyrrolidone such as p-phenylene diamine and 4,4'-diamino diphenyl sulfone and methylene dianiline can be used in place of oxydianiline in a suitable amount to enhance the high temperature properties of resultant polyamide while maintaining a polymer solubility of at least 0.15 gram per ml. of N-methyl pyrrolidone, as will now be apparent to the skilled artisan.

Oligomer mixtures of the similar nature can be prepared from the anhydride-hexafluoroisopropylidene diphthalic anhydride (BPAF) and oxydianiline alone under the aforementioned conditions. Polyimides prepared therefrom appear to retain their properties at high temperature and coblending of oligomers to enhance stability at high temperature does not appear necessary although such blending could be carried out and is within the scope of this invention. The same proportions of capping agent as above described and capping conditions should be suitable. Similarly, the same conditions for reaction with diamine are suitable as for the bis(3,4-dicarboxyphenyl) sulfone dianhydride and diamine. Substitution of metaphenylene diamine for oxydianiline with BPAF systems should also result in suitable oligomer mixtures for preparing polyimide.

The polymers of this invention may also be prepared. The reaction to polyamic acid preferably should be carried out in the same solvents as herein discussed for the oligomer system. The polyamic acid precursor can be cured to polyimides by conventional techniques such as those aforementioned.

The polyimides of this invention can be used as coating compositions, adhesives, circuit boards, reinforced composites, films, and as insulators for various minor electrical circuits.

In the Examples which follow all parts are by weight unless indicated.

Example 1

(1) A bis(3,4 - dicarboxyphenyl)sulfone dianhydride/oxydianiline oligomer at 40% solids was prepared by heating a mixture of 716.0 grams (2.0 moles) of bis(3,4-dicarboxyphenyl)sulfone dianhydride
36.0 grams (2.0 moles) of water
1850.0 grams of N-methyl pyrrolidone at 110° C. under nitrogen for one hour after the resultant solution was cooled to 30° C., 400.0 grams (2.0 moles) of oxydianiline were added and the total mixture stirred for one hour.

(2) A bis(3,4 - dicarboxyphenyl)sulfone dianhydride/metaphenyline diamine oligomer at 40% solids was prepared by heating a mixture of 930.8 grams (2.6 moles) of bis(3,4-dicarboxyphenyl)sulfone dianhydride
46.8 grams (2.6 moles) of water
1900.0 grams of N-methyl pyrrolidone at 105° C. under nitrogen for one hour. After the resultant solution was cooled to 40° C., 280.2 grams (2.6 moles) of metaphenyline diamine were added incrementally with stirring over a period of one hour.

(3) 600 grams of the oligomer solution of (1) were mixed with 600.0 grams of the oligomer solution of (2) for 1.5 hours. The resultant mixture was coated on glass cloth with a No. 50 wire wound rod followed by a thermal cure of 250° C. for 10 minutes. The resultant polyimide had excellent physical properties and showed no signs of precipitation when cured to a solid polyimide having a final thickness of 100 mil.

Example 2

Nine grams of the bis(3,4-dicarboxyphenyl)sulfone dianhydride/oxydianiline oligomer solution prepared in Example 1(1) were mixed with 11.0 grams of the bis(3,4-dicarboxyphenyl)sulfone dianhydride/metaphenyline diamine oligomer solution of Example 1(2). A film was drawn down for this mixture and cured at 400° F. for 45 minutes. The cured film was strong, continuous, creasable and had generally excellent properties.

Example 3

A one-liter, round bottom flask was equipped with a glass and "Teflon" stirrer, nitrogen inlet, thermometer, reflux condenser, and mantle. The flask was purged with nitrogen whereupon 111.0 grams (0.25 mole) of BPAF and 265 ml. of N-methyl pyrrolidone were added. Agitation was initiated and 15 ml. of anhydrous ethanol was added. The slurry was heated and became a clear solution at 80–90° C. The flask was further heated to 110° C. and maintained at this temperature for one hour. After cooling to room temperature, 50 grams (0.25 mole) of oxydianaline was added. This solution was stirred for a minimum of two hours after the addition of the oxydianaline. Inherent viscosity of this system at 40% solids is 0.20, solution viscosity is 2–5 poises.

The oligomer mixture can be formed into polyimide by high temperature thermal cure such as hereinbefore described.

Example 4

A 500-ml. round bottom flask was equipped with a glass and "Teflon" stirrer, condenser, nitrogen inlet, thermometer and mantle. The flask was charged with CSDA, N-methyl pyrrolidone, ethyl alcohol, and metaphenylene diamine in the amount of 107.4 gr. (0.3 mol) CSDA, 18 ml. of ethyl alcohol, and 185 gr. of N-methyl pyrrolidone purged with nitrogen with stirring and heating. The temperature was raised to 110° C. within 45 minutes and held there for an additional 45 minutes. The flask was cooled to 40° C. at which point metaphenylene diamine was added in an amount of 32.4 gr.

(0.3 mol). The flask was heated for one hour with stirring at a temperature between 40 and 48° C.

The resultant reaction product was drawn down to yield tough coherent flexible films on curing for one-half hour at 200° C.

I claim:

1. Process of preparing a film-forming polyimide, capable of forming a stable solution in N-methyl pyrrolidone at 25° C. at a level of at least 0.15 gram polyimide/ml. of N-methyl pyrrolidone after being dissolved therein at 100° C., comprising reacting in solvent at a temperature within the range of about 70 to 150° C.
   (a) bis(3,4-dicarboxyphenyl)sulfone dianhydride with
   (b) at least one member of the group consisting of water and alcohol of the formula ROH wherein R is at least one member of the group $CH_3$, $C_2H_5$, $C_3H_7$, and $C_4H_9$,
   (c) said solvent being at least one member of the group consisting of N-methyl pyrrolidone, dimethyl formamide and dimethylacetamide, (b) present in amount between 1 and 3 moles per mole of dianhydride and (a) and (b) are reacted for a time sufficient to react between 20 and 90% of the dianhydride;
   (d) reacting the reaction product of (a) and (b) in solvent (c) with diamine comprising metaphenylene diamine at a molar ratio of about 0.9:1 to 1.1:1 at a temperature less than 70° C.; and
   (e) subsequently heating said composition at a temperature of between about 150–325° C. for a time between about 30 minutes and two hours to form a polyimide.

2. The process of claim 1 wherein the reaction of (a) and (b) occurs at between about 100 and 110° C. with a molar ratio of about 2 moles of (b) to 1 mole of (a).

3. The process of claim 1 wherein the temperature of the reaction occurring in (d) is maintained at no more than 50° C.

4. A polyimide precursor solution in a solvent which is at least one member of the class consisting of N-methyl pyrrolidone, dimethylacetamide and dimethyl formamide which is an oligomer formed in solution of said solvent, of
   (a) the incomplete reaction product of 20 to 90% of bis(3,4-dicarboxyphenyl)sulfone dianhydride present and at least one member of the group consisting of water and an alcohol of the formula ROH wherein R is selected from the group consisting of $CH_3$, $C_2H_5$, $C_3H_7$ and $C_4H_9$, and
   (b) diamine comprising metaphenylene diamine.

5. A polyimide precursor in solution in a solvent which solvent is at least one member of the class consisting of N-methyl pyrrolidone, dimethylacetamide, and dimethyl formamide which is an oligomer formed in solution of said solvent, of
   (a) the incomplete reaction product of 20 to 90% of hexafluoroisopropylidene diphthalic anhydride present and at least one member of the group consisting of water and alcohol of the formula ROH wherein R is at least one member of the group consisting of $CH_3$, $C_2H_5$, $C_3H_7$, and $C_4H_9$ and
   (b) diamine, said diamine being at least one member of the group consisting of metaphenylene diamine and oxydianiline.

6. The process of claim 1 wherein between about 50% and 90% of the anhydride is reacted in the reaction between (a) and (b).

7. The process of claim 3 wherein between about 50% and 90% of the anhydride is reacted in the reaction between (a) and (b).

8. Process of preparing a polyimide comprising reacting in solvent at a temperature within the range of about 70 to 150° C.
   (a) hexafluoroisopropylidene diphthalic anhydride;
   (b) at least one member of the group consisting of water and alcohol of the formula ROH where R is at least one member of the group $CH_3$, $C_2H_5$, $C_3H_7$, and $C_4H_9$ in solvent;
   (c) said solvent being at least one member of the group consisting of N-methyl pyrrolidone, dimethyl formamide and dimethyl acetamide, (b) present in an amount between 1 and 3 moles per mole of anhydride and (a) and (b) are reacted for a time sufficient to react between 20 and 90% of the anhydride;
   (d) reacting the reaction product of (a) and (b) in solvent (c) with diamine comprising at least one member of the group consisting of oxydianiline and metaphenylene diamine at a molar ratio of about 0.9:1 to 1.1:1 and at a temperature less than 70° C.; and
   (e) subsequently heating said composition at a temperature of between about 150° C.–325° C. for a time between about 30 minutes and two hours to form a polyimide.

9. The process of claim 8 wherein between about 50% and 90% of the anhydride is reacted in the reaction between (a) and (b), the temperature of the reaction between (a) and (b) is between about 100 to 110° C. and the reaction of (d) is less than 50° C.

References Cited
UNITED STATES PATENTS

| | | | |
|---|---|---|---|
| 3,347,808 | 10/1967 | Lavin et al. | 260—47 |
| 3,349,061 | 10/1967 | Pruckmayr | 260—47 |
| 3,422,061 | 1/1969 | Gall | 260—47 |
| 3,622,525 | 11/1971 | Miller | 260—2.5 |

LESTER L. LEE, Primary Examiner

U.S. Cl. X.R.

260—32.6 N, 47 CP, 78 TF